Jan. 2, 1940.  D. D. MYERS  2,185,351
FEEDING AND INDEXING MECHANISM FOR MACHINE TOOLS
Filed June 22, 1936   2 Sheets-Sheet 1
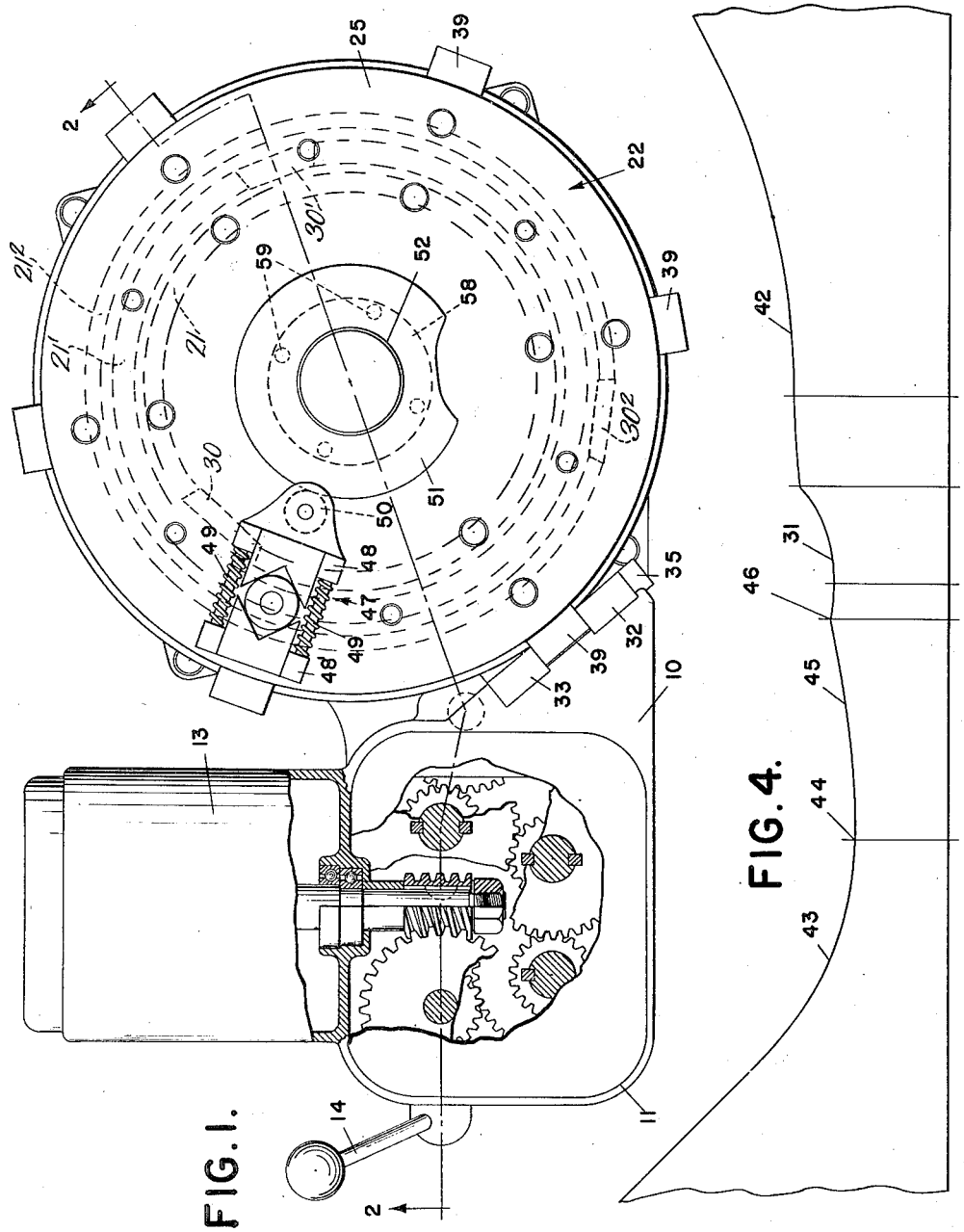
INVENTOR
DON D. MYERS
BY
ATTORNEYS

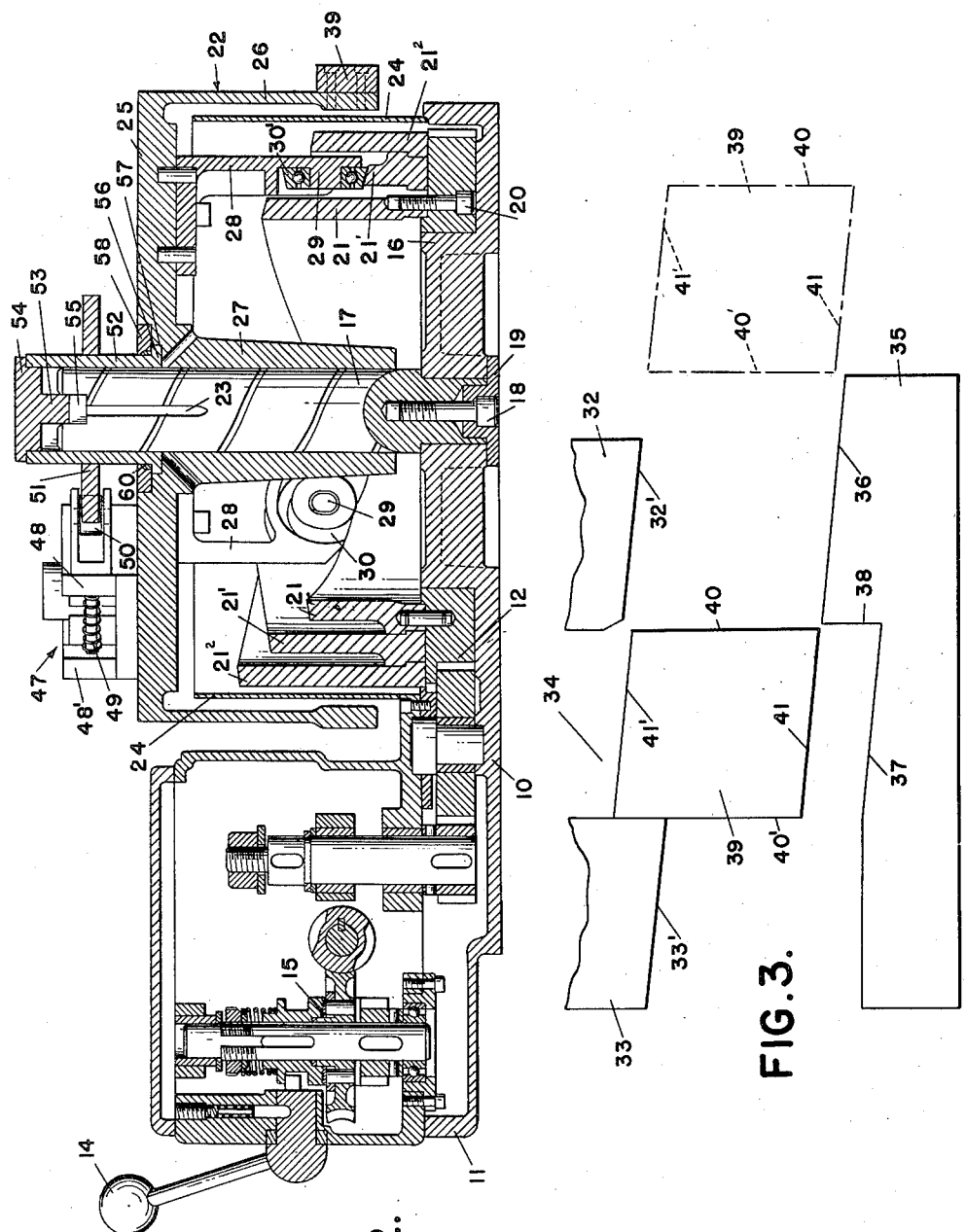

Patented Jan. 2, 1940

2,185,351

UNITED STATES PATENT OFFICE 2,185,351

FEEDING AND INDEXING MECHANISM FOR MACHINE TOOLS

Don D. Myers, Toledo, Ohio, assignor to Feedex Corporation, Toledo, Ohio, a corporation of Michigan Application June 22, 1936, Serial No. 86,670

16 Claims. (Cl. 29—50)

The present invention relates to feeding and indexing mechanism for machine tools, and more particularly to a machine in which a series of tools operate successively on a work piece. Specifically, the invention contemplates clamping a work piece or pieces on a table above which are a plurality of cutting tools arranged in angularly spaced relation and alternately rotating and reciprocating the table to position the work successively under each of the tools.

One of the objects of the invention is the provision of rotary cam means designed to engage the table and rotate the table therewith, together with stop means which periodically preclude rotation of the table whereby continued rotation of the cam means is transformed into reciprocating motion of the table.

It is a further object of the invention to gradually retard rotary motion of the table immediately prior to and after reciprocation thereof, thereby obviating sudden stopping and starting and the shocks incident thereto.

Another object of the invention is to release each work clamping device at a predetermined position of the table as the latter rotates. Still another object of the invention is the particular distribution of the lifting force exerted by the cam means, the latter comprising a plurality of members angularly and radially spaced from each other.

Other objects of the invention will be apparent from the following description of the invention and the accompanying drawings illustrating a preferred embodiment thereof, in which:

Fig. 1 is a top plan view of the machine and driving mechanism therefor;

Fig. 2 is a sectional elevation of the machine taken on line 2—2 of Fig. 1;

Fig. 3 is an enlarged fragmentary view of the stop guide and retarding means, and Fig. 4 is a partial development of the cam.

In the drawings, the base 10 supports a gear box indicated generally at 11. Gear 12 carrying the cam means is driven through suitable reduction gearing in the box by a motor 13. A hand lever 14 is employed to shift clutch 15, thereby to control rotation of the gears, the clutch being one of that type which permits overrunning when abnormal loads are placed on the driving mechanism.

It will be seen that a cylindrical projection 16 on the base forms a bearing for gear 12 and that the projection is bored to receive the reduced lower end of shaft 17, the latter being clamped to the base by bolt 18 and cap 19 and held in nonrotative relation to the base. Fixed to gear 12 by means of bolts or similar securing means 20 are a plurality of cams, in the present instance three, indicated at 21, 21′ and 21². Work holding table 22 is mounted on shaft 17 for rotary and reciprocating movement thereon, suitable oil grooves 23 being provided for lubrication of the shaft. A cylindrical wall 24 on the base provides a well for holding a lubricant, thus providing for immersion of certain parts of the mechanism in the lubricant.

The table 22 is in the form of an inverted cup having the top or work supporting portion 25, a cylindrical side wall 26 and a centrally disposed axial extension 27, the latter being bored to form a bearing for the table. Secured to the under side of the table top are a plurality of brackets 28, each having a boss 29 which form supports for anti-friction rollers 30, 30′, 30², constituting cam followers. The followers engage or rest on cams 21, 21′, 21², respectively, and support the table thereon. The three cams are spaced concentrically from each other about the axis of the gear 12 and shaft 17. They are also displaced angularly to each other, that is, the rises thereon are symmetrically displaced, for instance, 120° apart when three cams are employed, and the remaining portions of the cams, which are similar in their development, are displaced a like number of degrees. Similarly, the three followers 30, 30′, 30², are positioned 120° apart and spaced from the table axis to cooperate with their respective cams, so that when there is relative rotation between the cams and the followers, the lifting effects of the several cams will be exerted simultaneously. This arrangement insures distribution of the load, and centering of the table.

Referring to Fig. 4, the contour of each cam includes a depression indicated at 31 and having a radius substantially equal to that of its follower. When the follower registers with this depression, the table is free to rotate and will be carried with the cams. At this time the machine is indexing. Referring now to Fig. 3, a pair of spaced parallel vertical guide pieces 32, 33, are secured to gear box 11 and form a guideway 34. Piece 33 also forms a stop element. Fastened to base 10 is a guide member 35 having a pair of inclined faces 36, 37, and a face 38 therebetween, the latter face being vertical and in alignment with one edge of the piece 32. It is to be noted that the lower edges 32′, 33′ of pieces 32 and 33 are parallel to the inclined faces of member 35. Secured exteriorly to the side wall of table 22 are a plurality of abutments 39 having the shape indicated in Fig. 3, with a pair of vertical edges 40, 40' spaced a distance slightly less than the width of guideway 34, and inclined edges 41, 41', the distance between which is somewhat less than that between faces 36, 37, and the lower edges of pieces 32, 33.

Assuming that the machine is indexing and that one of the abutments is in the position indicated by dotted construction lines, Fig. 3, that is, its lower edge 41 is about to engage the face 36 on guide 35, the cam follower is engaging the depressed portion 31 of the cam. As soon as the faces 41 and 36 engage, the frictional contact between these faces retards rotation of the table but, because vertical movement of the abutment is limited by faces 36 and 32, the cam necessarily continues to rotate the table. The retardation is sufficient, however, to prevent jarring when edge 40 of the abutment contacts stop piece 33. In this latter position, indicated by the full lines in Fig. 3, rotation of the table is completely arrested, but since the cams continue to rotate, the upwardly inclined face 42 of each cam passes under its follower, thereby elevating the table in a vertical direction defined by guideway 34. When the rise in each cam passes the follower, the downwardly inclined face 43 permits the table to fall until the lowest point of the cam indicated at 44 is reached, at which time the lower edge 41 of the abutment rests on face 37 and the upper edge 41' is sufficiently low to pass the lower edge of stop piece 33. The table again tends to rotate when the portion 45 of the cam exerts a horizontal component force on its follower, but this force is so gradually exerted that rotation begins slowly. Faces 37, 33' also guide the abutment and limit its vertical movement so that as the cam rotates, the frictional retardation continues until the point 46 is permitted to pass the follower. The follower then rests in depression 31 and the table is rotated until the next abutment engages stop piece 33.

Secured to the table above its top is a work holding clamp 47 comprising a pair of jaws 48, 48', the former being retractible with respect to the latter and normally moved to work releasing position by springs 49 which tend to separate the jaws. Although only one clamp is shown, it is to be understood that there may be a number of work holders corresponding to the number of cutting operations, and that the number of abutments depends on the number of work holders. Jaw 48 carries a roller 50 which engages cam 51 on sleeve 52. This sleeve fits over the upper end of shaft 17, but is held against rotation thereon by a rectangular abutment 53 on cap 54 cooperating with slot 55 in the shaft. The cap is pinned or otherwise secured to the sleeve. The lower end of sleeve 52 is flanged at 56 and is seated in a recess 57 in the top of the table, being secured therein by a plate 58 held to the table by screws 59. The sleeve is rotatable with respect to the table, suitable packing 60 being provided to protect the bearing surface adjacent flange 56. The sleeve is also movable vertically with the table, but since the table does not rotate during its reciprocation, the angular relation or projection 53 and slot 55 remains unchanged when the projection lies above the slot. When the table is in its lowermost position it is rotated, but projection 53 is in cooperative relation with slot 55 at this time, and the table rotates with respect to the sleeve. It will be seen, therefore, that cam 51 is non-rotative but is adapted to rise and fall with the table. The cam is provided with a depressed dwell as shown, and as the work holder registers therewith, the clamps separate to release the work piece held therein. A new work piece is then inserted in the holder and as the follower on jaw 48 rotates with the table, it is moved towards jaw 48' by the high portion of the cam, and clamps the work in the holder.

From the foregoing description it will be obvious that rotation of the table is arrested as each of the abutments registers with the guides and stop piece 33. At this time each work holder is positioned directly under a tool. The table is then elevated to present the work pieces to the tools, after which it is lowered and again rotated to bring each work piece under another tool spaced angularly from the first mentioned tool. The table is again reciprocated so that the several work pieces are presented to the successive cutting operations. Each work piece thus passes through a cycle beginning with the closing of the clamped jaws thereon, followed by the several successive cutting operations and finally release of the piece as the work holder registers with the lower side of the cam.

While the form of the invention illustrated in the drawings is a preferred one, it is not intended that the particular arrangement of the several parts thereof be strictly adhered to, but that it be varied to meet requirements peculiar to the type of cutting performed and the class of work operated upon.

What I claim as my invention is:

1. A machine of the class described comprising a base, a table mounted on said base for rotary and reciprocating movement relative thereto, means for alternately rotating and reciprocating said table, work clamping means rotatable and reciprocable with said table, cam means on said table for releasing said clamping means, and means for holding said cam means against angular displacement with respect to said base.

2. A machine of the class described comprising a base, a stationary shaft thereon, a table mounted for rotary and reciprocating movement on said shaft, means for alternately rotating and reciprocating said table, work clamping means rotatable and reciprocable with said table, means for releasing said clamping means, and means on said shaft for holding said releasing means to permit relative rotation of the table and the releasing means.

3. A machine of the class described comprising a base member, a table member journaled on said base member for rotary and reciprocating movement relative thereto, a plurality of radially spaced annular cams on one of said members, and a plurality of followers on the other of said members, said cams being angularly displaced with respect to each other, said followers being correspondingly angularly displaced from each other whereby simultaneous axial displacement of the followers by said cams is effected.

4. A machine of the class described comprising a base, a table mounted on said base for rotary and reciprocating movement relative thereto, means for alternately rotating and reciprocating said table, work clamping means rotatable and reciprocable with said table, cam means on said table for releasing said clamping means when said table is positioned in predetermined relation to said base, said clamping means actively clamping the work in all other positions of the table, and means for holding said cam means against angular displacement with respect to said base.

5. A machine of the class described comprising a base, a table mounted on said base for rotary and reciprocating movement relative thereto, means for alternately rotating and reciprocating said table, an abutment on said table and opposed guide members on the base slidably engaging opposite sides of the abutment in a manner to introduce sufficient friction to retard rotary movement of the table prior to reciprocating said table.

6. A machine of the class described comprising a base, a table mounted on said base for rotary and reciprocating movement relative thereto, means for alternately rotating and reciprocating said table, an abutment on the table, said abutment having inclined faces, opposed guide members on the base having similarly inclined faces disposed in the path of rotary travel of said abutment and frictionally engaging the abutment to retard rotary movement of the table prior to reciprocation thereof, and means engageable with the abutment to positively stop rotary movement of the table prior to the operation of the first named means to effect reciprocation of the table.

7. A machine of the class described comprising a base, a table mounted on said base for rotary and reciprocating movement relative thereto, means for alternately rotating and reciprocating said table, and means on said base slidably engageable with a part rotatable as a unit with the table subsequent to reciprocation thereof to resist initial rotary movement of the table.

8. A machine of the class described comprising a base, a table mounted on the base for rotary and reciprocating movement relative thereto, means for alternately rotating and reciprocating said table, and means on said base slidably engageable with a part rotatable as a unit with the table in a manner to introduce sufficient friction to retard rotary movement of the table immediately prior to reciprocation thereof, and means cooperating with the last named means to guide the table upon reciprocation thereof.

9. A machine of the class described comprising a base, a table mounted on said base for rotary and reciprocating movement relative thereto, means for alternately rotating and reciprocating said table, means on said base slidably engageable with a part rotatable as a unit with the table in a manner to introduce sufficient friction to retard rotary movement of the table immediately prior to reciprocation thereof, and additional means slidably engageable with the part aforesaid subsequent to reciprocation of the table to retard acceleration of the rotary movement of the table.

10. A machine of the class described comprising a base, a table mounted on said base for rotary and reciprocating movement relative thereto, means for alternately rotating and reciprocating said table, and means fixed against rotation and slidably engageable with a part rotatable as a unit with the table before and after reciprocation of the table in a manner to introduce sufficient friction to respectively retard the rotary movement of the table prior to reciprocation and retard acceleration of the rotary movement of the table after reciprocation.

11. A machine of the class described comprising a base, a table mounted on the base for rotary and reciprocating movement relative thereto, a rotatable cam member on the base, follower means on the table engageable with the cam and rotatable therewith, means on said base engageable with a part rotatable as a unit with the table to arrest rotary movement of the table and effect relative rotation of the cam and follower to provide for reciprocation of the table, and means slidably engageable with said part prior to engagement of the same with the arresting means in a manner to introduce sufficient friction to retard the rotary movement of the table.

12. A machine of the class described comprising a base, a table mounted on said base for rotary and reciprocating movement relative thereto, means for alternately rotating and reciprocating the table, means on said base and engageable with a part rotatable as a unit with the table to arrest rotation of the table, and means slidably engageable with said part prior to engagement of the latter with the stop means on the base in a manner to introduce sufficient friction to retard rotary movement of the table, said last named means cooperating with both the arresting means and part aforesaid on the table to guide the latter during reciprocation thereof.

13. A machine of the class described comprising a base, a table mounted on said base for rotary and reciprocating movement relative thereto, means for alternately rotating and reciprocating said table, an abutment on the table, a stop on the base engageable with the abutment to positively stop rotation of the table prior to reciprocation of the latter, opposed guide members on the base slidably engageable with opposite sides of the abutment prior to engagement of the latter with the stop to introduce sufficient friction to retard rotation of the table, one of the guide members and said stop cooperating to form a vertical passage for receiving the abutment to guide the table during reciprocation thereof, and said stop also having a surface slidably engageable with the abutment upon completion of the reciprocating movement of the table to introduce sufficient friction to retard acceleration of the rotary movement of the table.

14. A machine of the class described comprising a base member, a table member mounted on the base member for movement in two different directions, means for alternately moving the table member in said directions, an abutment on one of said members, and opposed guide surfaces on the other of said members slidably engageable with opposite sides of the abutment upon movement of the table member in one direction to introduce sufficient friction to retard movement of the table member prior to changing the direction of movement of said table member.

15. A machine of the class described comprising a base member, a table member mounted on the base member for movement in two different directions, means for alternately moving the table member in said directions, an abutment on one of said members, opposed guide surfaces on the other of said members slidably engageable with opposite sides of the abutment upon movement of the table member in one direction to introduce sufficient friction to retard movement of the table member prior to changing the direction of movement of said table member, and means for arresting movement of the table prior to changing the direction of movement thereof, said means including a stop on the base member and cooperating with the abutment to guide movement of the table member in the other direction.

16. A machine of the class described comprising a base member, a table member mounted on the base member for movement in two different directions, means for alternately moving the table member in said directions relative to the base member, an abutment on the table member, a stop on the base engageable with the abutment to arrest movement of the table member in one direction prior to moving said table member in the other direction, and opposed guide surfaces on the base member fixed with respect to movement of the table member and slidably engageable with opposite sides of the abutment as the table member moves in the first named direction to introduce sufficient friction to retard said movement of the table member prior to engagement of the abutment with said stop.

DON D. MYERS.